Jan. 21, 1958   R. I. PRUPIS   2,820,325
DOLL EYE
Filed April 28, 1955
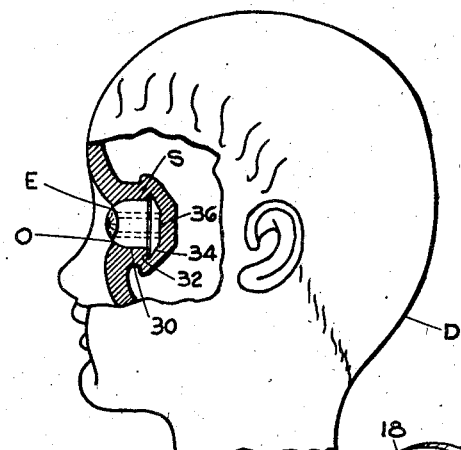
FIG. 1
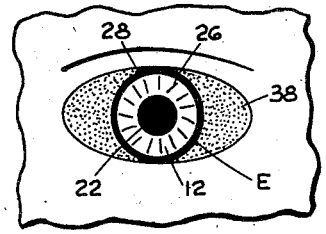
FIG. 2
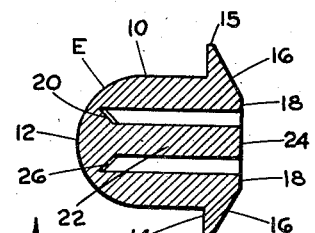
FIG. 4
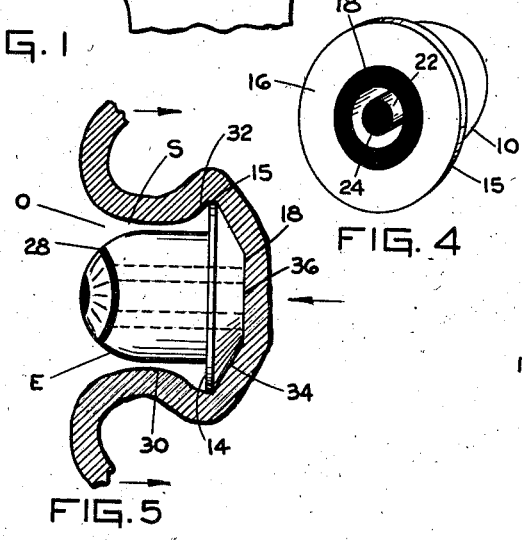
FIG. 5
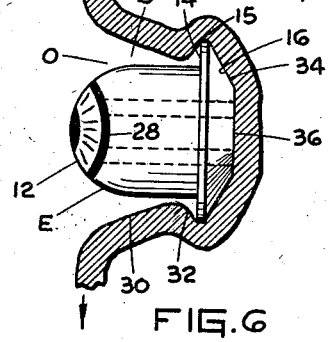
FIG. 3
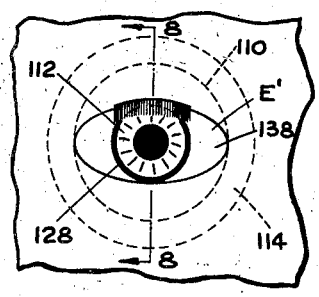
FIG. 7
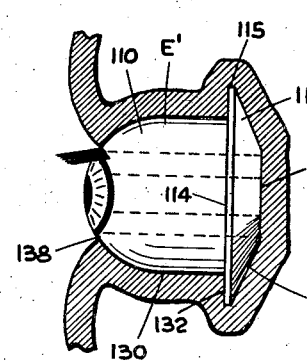
FIG. 9
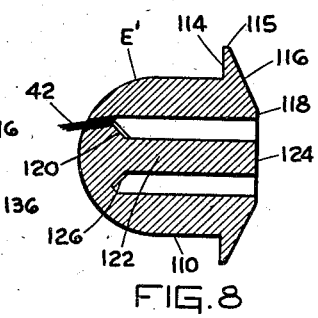
FIG. 8
FIG. 6
INVENTOR.
ROBERT I PRUPIS
BY James and Franklin
ATTORNEY

United States Patent Office 2,820,325
Patented Jan. 21, 1958

2,820,325

DOLL EYE

Robert I. Prupis, West Orange, N. J., assignor to Margon Corporation, Bayonne, N. J., a corporation of New Jersey Application April 28, 1955, Serial No. 504,612

4 Claims. (Cl. 46—165)

This invention relates to flexible dolls, and more particularly to stationary eyes therefor.

Flexible dolls are in wide commercial use today. There are generally two types, those in which a hollow head and body are separately molded and then connected to each other, and those in which the head and body are integrally molded in one piece. Both types are made by slush molding vinyl compound slurries in hollow molds. The process is comparatively inexpensive, and results in dolls of extremely fine character detail having a soft skin-like texture.

Stationary eyes have been supplied to the doll manufacturing industry to satisfy the demand for a comparatively inexpensive product, compared to movable or "sleeping eyes." The present commercial stationary eye has two parts, and comprises a plastic lens having a rearwardly extending projection or stud, together with a so-called "Speed" or "Tinnerman" nut. The front part of the lens has a diameter equal to the diameter of the iris portion, and the rearwardly extending stud has a diameter equal to the diameter of the pupil portion. The lens part of the two-piece assembly is generally of the type shown in Marcus Patent No. 2,254,232, granted September 2, 1941.

The flexible hollow head is molded with shallow sockets or recesses to accept the front or iris portion of the lens, and the base of the recess has a hole punched through the material of the doll's head to permit the stud to pass therethrough to the inside of the head. The holding nut is passed up into the head through the neck opening and is slipped over the stud so that after assembly the lens is prevented from being pulled out of its socket. The white or sclera portion of the eye is simulated by applying a white paint to the area of the doll's head immediately surrounding the socket or lens.

It will be apparent that the lens-nut type of stationary eye can only be used for the type of doll wherein the head and body are molded separately, with the head hollow, because it is essential that there be a neck opening leading to the inside of the head in order to permit putting the nut over the interiorly located stud.

It has been proposed to provide a single-piece stationary eye for a rubber doll which may be inserted from the front. As shown in the patent to Rommer, 1,650,468, the eye is in the form of a dished or concavo-convex disk, the iris and pupil being depicted on the outer convex surface. The head at the eye area is molded with a convex protuberance and surrounded by spaced lips to provide a circular undercut groove to receive the edge of the eye disk. Although the Rommer eye is a one-piece affair and comparatively simple to fabricate, the frontally located lips around the periphery of the eye disk do not furnish sufficient holding power against its removal from the head. Upon removal of the eye, the doll is, of course, disfigured, in addition to the objection that the eye disk is an object which a child can readily swallow.

The primary object of the present invention is to provide a stationary doll's eye which is inexpensive to fabricate, easy to insert in a doll's head, but practically impossible to remove.

Another object of the invention is to eliminate the assembly operation required by the eye-nut assembly presently being used, thereby reducing the cost of manufacture of the finished product. Also, the doll's eye of the present invention may be used for either the integrally molded head and body variety of doll, or the type in which the head and body are separately molded.

A further object of the invention is to provide a more natural-appearing stationary doll's eye in that, instead of painting the portion of the head surrounding the socket to simulate the sclera or white portion of the eye, the eye itself is made to furnish the white or sclera portion, at no increase in overall cost.

Still another object of the invention is to provide a stationary eye in which the natural dark periphery surrounding the iris is supplied in a simple, effective, and inexpensive manner.

Other objects, advantages and results of the invention will be brought out by the following description in conjunction with the accompanying drawings, in which:

Fig. 1 is a side elevational view, partly in vertical section, showing a flexible doll's head having secured therein one form of eye made in accordance with the present invention;

Fig. 2 is a partial front elevational view of a doll's head having the eye of the present invention secured therein;

Fig. 3 is a vertical cross-sectional view of the eye of the present invention;

Fig. 4 is a perspective view taken from the rear of the eye;

Figs. 5 and 6 are side elevational views showing how the eye resists removal from the head;

Fig. 7 is a partial front elevational view of a doll's head having secured therein another embodiment of an eye made in accordance with the present invention;

Fig. 8 is a vertical cross-sectional view taken approximately in the plane of line 8—8 of Fig. 7; and Fig. 9 is a side elevational view of a doll's head having the eye shown in Figs. 6 and 7 secured within the eye socket.

Referring to the drawing, and more particularly to Fig. 1, a doll's head D is molded of a suitable flexible plastic material, and, at the same time, two spaced eye sockets S (only the nearer one of which is visible) are molded within the head. The head may be solid instead of hollow, and may be integrally molded with the body of the doll, not shown. The doll's head is molded with eye openings O through which the eyes E may be inserted from the front.

Referring now to Figs. 1 to 6, the eye E is molded as a single piece from a suitable transparent plastic, such as cellulose acetate, cellulose acetate-butyrate, or styrene. The eye comprises a hollow, elongated cylindrical or tubular portion 10 having a diameter at least equal to the diameter desired for the iris portion 12. The overall length of the eye is preferably equal to or greater than its diameter. The iris portion appears at the generally hemispherical front portion or closed end of the tubular portion 10. The rear part of the eye is provided with a forwardly facing circular shoulder, abutment or flange 14. The forward face of the flange is preferably at a right angle to the surface of the cylindrical portion 10. (The expressions "forwardly facing" and "rearwardly facing" are used in a relative sense, and express direction with regard to a doll in the position shown in Fig. 1.) The flange has a thin outer edge 15, from which there is a downward slope or frusto-conical taper 16 rearwardly to a circular flat base 18 at the back end. The axial length of the eye ahead of the flange is at least half and preferably about four-fifths of the overall length of the eye.

The inner surface of the front of the eye is preferably frusto-conical in configuration, and includes a portion 20 which tapers down to a darkened central portion to provide the pupil portion of the eye. Preferably, the pupil portion is provided by a cylindrical stud 22 which extends rearwardly within the inner hollow portion of the eye. In the embodiment shown, the stud extends all the way to the rear of the piece, so that its extreme rear surface 24 is in the same vertical plane as the circular base 18. The portion 20 is provided with radial serrations 26 which serve to simulate the lines of the iris.

The eye E is preferably made of a transparent plastic material, which may be tinted blue or brown to furnish either a blue or brown iris color. To furnish the desired dark color for the pupil, the end 24 of the stud 22 is covered with a dark or black paint. Actually, by virtue of the described construction, the rear of the eye E may be simply pressed onto a paint pad, whereupon both of the flat surfaces 18 and 24 will receive the dark color. The annular base 18 is so dimensionally related to the iris portion 12 that at the front of the eye a dark circular rim 28 is reflected from the rear of the eye around the iris portion 12, thereby imparting a natural appearance to the eye.

The doll's head D is molded with a socket S having a configuration which mates with the contour of the described eye E, except that the socket has a front opening O. The socket is molded with a cylindrical forward portion 30 (Fig. 1), which terminates in a rearwardly facing flange or shoulder 32, and then tapers down at 34 to the extreme rear or base of the socket 36. Preferably, the dimensions of the socket are slightly smaller than the given size eye which it is to receive, so that the flexible elastic material of the head will take a grip on the eye after it is inserted.

The eyes E are inserted in the doll's head by simply pushing each eye through its receptive opening O. The base 18 has a diameter less than the diameter of the eye opening, and the taper 16 facilitates entry of the eye into the socket when ordinary hand pressure is applied. When the flange 14 of the eye is seated behind the shoulder 32 of the socket, the eye is in place, and it is virtually impossible to dislodge it.

As shown in Fig. 5, if the material of the head is pushed at the rear of the socket, and even if at the same time pulled back at the areas immediately surrounding the eye opening, as indicated by the arrows, the flange 14 cannot be made to bypass the rearwardly facing shoulder 32 of the doll's head material. This shoulder, even when deformed and pulled far forward, is still undercut relative to the edge 15 of the flange. Moreover, the edge 15 bites into the flexible material of the doll and this too prevents the eye from being ejected. Also, as shown in Fig. 6, pulling up and down at the doll's head material in the direction of the arrows there indicated, likewise cannot deform the socket sufficiently to permit dislodging the eye. Efforts by strong adults to dislodge the eyes have been unsuccessful.

The eye sockets are molded by providing the hollow mold with plugs having substantially the same configuration as the described eye. The flexible doll's head (or head and body combination) can be stripped out of the mold, and off the plugs, because the mold and the molded article have sufficient size and body to permit their seizure and relative separation. On the other hand, the eye, once seated in a socket, is not externally exposed to be seized, and moreover is small, smooth and rounded. Any attempt to remove the eye from the socket must overcome the resistance provided by the abutting shoulders 14 and 32, which are located a substantial distance inwardly from the opening O. In conjunction with the strong elasticity afforded by the flexible plastic material of the doll, there is no way to apply sufficient force to dislodge the eye.

A part of the doll's head material at the eye opening is painted white, as indicated at 38 in Fig. 2, to simulate the sclera around the iris. This is conveniently done before inserting the eye in the socket.

Another form of the invention is illustrated in Figs. 7 to 9. The eye E' is essentially the same as the eye previously described, except that for a given size of eye the cylindrical portion 110 is made much larger in diameter, in order to provide a sclera portion 138 surrounding the iris 112. As before, the rear end of the eye is molded with a flange having a front wall 114, a peripheral edge 115, a sloping rear wall 116, and an annular rear surface or base 118. The rear of the iris is preferably frusto-conical, as indicated at 120 in Fig. 8, and the pupil of the eye is preferably simulated by a cylindrical stud 122 extending back to a rear surface 124, which preferably lies in the same plane as the annular base 118, so that both may be blackened simultaneously. The frusto-conical iris surface 126 is preferably radially serrated, as indicated at 126. The iris color is preferably provided by using a slightly tinted though transparent plastic for the eye, the usual tints being brown or blue. The black coating at 124 provides the desired black pupil, and the black coating at 118 helps emphasize the iris by darkening its periphery, as indicated at 128. It will be noted that these numbers all correspond to the numbers used for like parts in Figs. 1 through 6, but increased by 100.

The eye E of Figs. 1 and 2 simulates only the iris, and may have a diameter approximating or greater than that of the iris, whereas the eye E' of Fig. 7 simulates the complete eyeball, and should have a diameter approximating or greater than that of the eyeball. The eye opening in Figs. 1 and 2 may be and preferably is circular, but the eye opening in Fig. 7 preferably is elliptical. The front of the eye E' is convex and is properly made hemispherical. The front of the eye E is convex and may be made hemispherical, for convenience, but also may be made to conform to the surface of a sphere which is larger in diameter than the diameter of the cylindrical part 30 if the latter has been kept close to the iris diameter, because the said larger sphere may correspond to the eyeball size, instead of the iris size.

Of course, if the eye E of Fig 1 is made substantially larger in diameter than the iris, then the essential difference between the two forms of the invention is simply that in the first form the eye opening in the doll head is circular and approximates the size of the iris; the white color is applied to adjacent parts of the head; and no white color is needed on the eye itself; whereas in the second form of the invention the eye opening is elliptical, the head needs no white, and the white color is applied to the eye itself.

The white color for the eye E' may be applied by spraying the smooth hard front portion of the eye after masking the iris. In this fashion, the white has a more liquid or lustrous appearance than is obtainable when applying white paint to the soft and flexible plastic material of the head, as in Fig. 2. Also, if desired, the eye E' may be slotted, or molded with a slot above the iris, for the insertion of a lash 42.

It may be mentioned that the eye of Figs. 7–9 need not necessarily be made in cylindrical form with a circular cross-section. The eye opening is elliptical, and the eye is stationary, and it is therefore possible to eliminate or flatten the top and bottom portions of the eye, thereby giving it an elliptical cross-section having major and minor diameters at least equal to and preferably slightly greater than the major and minor diameters of the eye opening. The outwardly projecting flange 114 in such case is also elliptical, and the eye sockets are themselves matingly elliptical in cross-section. Of course, the stud 122 remains cylindrical and corresponds to the pupil, and the annular hollow region around the stud corresponds to the iris and likewise may be circular in cross-section. It is only the solid material outside the iris portion that is changed from circular to elliptical cross-section.

While the elliptical cross-section would save material, I prefer the circular cross-section at this time for the reason that it is necessary for the eye manufacturer to accommodate the convenience of his customer, the doll manufacturer. The latter must make the molds for the doll heads, which in turn are provided with cores or so-called "plugs" to form the eye sockets. These plugs are most easily and inexpensively made with a circular cross-section. There is a similar advantage to the eye manufacturer in making the molds for molding the eye members, for it is more convenient and less expensive to employ mold cavities which are circular in section.

It is believed that the novel eye structure of my invention, and the doll provided with such eyes, as well as the advantages thereof, will be apparent from the foregoing detailed description. The new eye is easily inserted in a doll's head, and thereafter is virtually impossible to remove. The new eye permits the doll manufacturer to fabricate his product with the least number of operations, and with less expense. The finished doll is superior in appearance and quality.

It will be understood that while the invention has been shown and described in several preferred forms, changes may be made in the structures disclosed without departing from the scope of the invention, as sought to be defined in the following claims. In the claims the term "cylinder" is not intended to exclude a cylinder of elliptical instead of circular cross-section.

I claim:

1. A stationary doll's eye for use in a flexible, rubber-like head having individual substantially enclosed eye sockets within the head, said sockets having eye openings at the front of the head, said eye being integrally molded of transparent, plastic material and comprising a hollow, elongated cylindrical portion having a diameter at least as great as the diameter of the iris portion of the eye, the front of said cylindrical portion being convex, the surface of the front inside the cylindrical portion being frusto-conical in shape, serrated to provide iris lines and tapering down to a substantially cylindrical stud to provide the pupil portion, said stud extending rearwardly to the back of the eye, and a forwardly facing flange extending outwardly from said cylindrical portion and located at least at the rear half of the eye, the rear face of said flange sloping inwardly toward the back of the eye and terminating in an annular base having a diameter less than an eye opening to facilitate insertion of the eye in a socket, said annular base having an inner peripheral edge of a diameter substantially corresponding to the iris diameter so as to provide a darkened periphery therearound when a dark color is applied to the stud and base.

2. A stationary doll's eye for use in a flexible, rubber-like head having individual substantially enclosed eye sockets within the head, said sockets having eye openings at the front of the head, said eye being integrally molded of transparent, plastic material and comprising a hollow, elongated cylindrical portion having a diameter at least as great as the diameter of the iris portion of the eye, the front of said cylindrical portion being convex, the surface of the front inside the cylindrical portion being frusto-conical in shape, serrated to provide iris lines and tapering down to a substantially cylindrical stud to provide the pupil portion, said stud extending rearwardly to the back of the eye, and a forwardly facing flange extending outwardly from said cylindrical portion and located at least at the rear half of the eye, the rear face of said flange sloping inwardly toward the back of the eye and terminating in an annular base having a diameter less than an eye opening to facilitate insertion of the eye in a socket, said annular base being in the same plane as the end of said stud, and having an inner peripheral edge of a diameter substantially corresponding to the iris diameter so as to provide a darkened periphery therearound when a dark color is applied to the stud and base.

3. A stationary doll's eye for use in a flexible, rubber-like head having individual substantially enclosed eye sockets within the head, said sockets having eye openings at the front of the head, said eye being integrally molded of transparent, plastic material and comprising a hollow, elongated cylindrical portion having a diameter at least as great as the diameter of the iris portion of the eye, the front of said cylindrical portion being convex, the surface of the front inside the cylindrical portion being frusto-conical in shape, serrated to provide iris lines and tapering down to a substantially cylindrical stud to provide the pupil portion, said stud extending rearwardly to the back of the eye, and a forwardly facing flange extending outwardly from said cylindrical portion and located at least at the rear half of the eye, the rear face of said flange sloping inwardly toward the back of the eye and terminating in an annular base having a diameter less than an eye opening to facilitate insertion of the eye in a socket, said annular base being in the same plane as the end of said stud, said stud and base having a dark color applied thereto with said base providing a darkened periphery around said iris.

4. A stationary doll's eye for use in a flexible, rubber-like head having individual substantially enclosed eye sockets within the head, said sockets having eye openings at the front of the head, said eye being integrally molded of transparent, plastic material and comprising a hollow, elongated cylindrical portion having a diameter slightly greater than the diameter of the white portion surrounding the iris portion of the eye, the front of said cylindrical portion being generally hemispherical, the surface of the front inside the cylindrical portion and behind the iris portion being frusto-conical in shape, serrated to provide iris lines and tapering down to a substantially cylindrical stud to provide the pupil portion, said stud extending rearwardly to the back of the eye, and a forwardly facing flange extending outwardly from said cylindrical portion located at least at the rear fifth of the eye's overall length, the rear face of said flange sloping inwardly toward the back of the eye and terminating in an annular base having a diameter less than an eye opening to facilitate insertion of the eye in a socket, said annular base being in the same plane as the end of said stud, and having an inner peripheral edge of a diameter substantially corresponding to the iris diameter so as to provide a darkened periphery therearound when a dark color is applied to the stud and base.

References Cited in the file of this patent

UNITED STATES PATENTS

| 2,021,115 | Jackson | Nov. 12, 1935 |
| 2,133,635 | Schaeffer | Oct. 18, 1938 |
| 2,657,500 | Samolewitz | Nov. 3, 1953 |

FOREIGN PATENTS

| 640,959 | Great Britain | Aug. 2, 1950 |
| 646,745 | Great Britain | Nov. 29, 1950 |